United States Patent
Ravise et al.

(10) Patent No.: US 12,454,104 B2
(45) Date of Patent: Oct. 28, 2025

(54) ASSEMBLY JIG FOR A CELLULAR STRUCTURE, ASSEMBLY DEVICE COMPRISING SAID JIG, AND METHOD FOR MANUFACTURING A CELLULAR STRUCTURE USING SAID JIG

(71) Applicant: Airbus Operations SAS, Toulouse (FR)

(72) Inventors: Florian Ravise, Toulouse (FR); Maxime Gauthier, Toulouse (FR); Manuel Teigne, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 223 days.

(21) Appl. No.: 18/075,293

(22) Filed: Dec. 5, 2022

(65) Prior Publication Data
US 2023/0173766 A1 Jun. 8, 2023

(30) Foreign Application Priority Data
Dec. 7, 2021 (FR) .................................. 2113039

(51) Int. Cl.
*B29C 65/72* (2006.01)
*B29C 65/00* (2006.01)

(52) U.S. Cl.
CPC ............ *B29C 66/438* (2013.01); *B29C 65/72* (2013.01)

(58) Field of Classification Search
CPC ............................. B29C 66/438; B29C 65/72
See application file for complete search history.

(56) References Cited

U.S. PATENT DOCUMENTS

| | | | |
|---|---|---|---|
| 2,821,616 A * | 1/1958 | Spott ...................... | B21D 47/00 428/116 |
| 3,134,705 A | 5/1964 | Moeller | |
| 3,379,594 A | 4/1968 | Bruder | |
| 5,399,221 A * | 3/1995 | Casella .................. | B29C 65/18 428/118 |
| 5,549,773 A * | 8/1996 | Henderson .............. | B29C 65/30 428/116 |
| 9,365,022 B2 * | 6/2016 | Kendrick ............ | B29C 66/0042 |
| 9,586,378 B2 * | 3/2017 | Le Monnier ....... | B29D 99/0089 |
| 2020/0143786 A1 | 5/2020 | Ravise et al. | |
| 2022/0355566 A1 | 11/2022 | Cariou | |

FOREIGN PATENT DOCUMENTS

| | | |
|---|---|---|
| EP | 3650332 A1 | 5/2020 |
| FR | 3098143 A1 | 1/2021 |

OTHER PUBLICATIONS

French Search Report dated Jul. 14, 2022; priority document.

* cited by examiner

*Primary Examiner* — Philip C Tucker
*Assistant Examiner* — John Blades
(74) *Attorney, Agent, or Firm* — Greer, Burns & Crain, Ltd.

(57) ABSTRACT

An assembly jig for a cellular structure made from strips of material placed adjacent to each other and joined together so as to form first and second cells, opening on the first and second faces of the cellular structure, respectively. This assembly jig includes a housing delimited by a base and first and second side faces, configured for housing the strips of material of a cellular structure to be formed, superimposed on each other, a plurality of pins configured to be positioned between the superimposed strips of material in the first and/or second cells. An assembly device comprising the jig, and a method for manufacturing a cellular structure using the jig are also provided.

12 Claims, 5 Drawing Sheets

ASSEMBLY JIG FOR A CELLULAR STRUCTURE, ASSEMBLY DEVICE COMPRISING SAID JIG, AND METHOD FOR MANUFACTURING A CELLULAR STRUCTURE USING SAID JIG

CROSS-REFERENCES TO RELATED APPLICATIONS

This application claims the benefit of the French patent application No. 2113039 filed on Dec. 7, 2021, the entire disclosures of which are incorporated herein by way of reference.

FIELD OF THE INVENTION

The present application relates to an assembly jig for a cellular structure, to an assembly device comprising said jig, and to a method for manufacturing a cellular structure using said jig.

BACKGROUND OF THE INVENTION

According to one embodiment of the prior art, a soundproofing coating comprises a porous or sound-resistant layer in contact with a medium in which sound waves are propagated, a cellular structure, and a reflective layer.

According to a simplified embodiment, the honeycomb-type cellular structure comprises a plurality of adjacent cells which are identical and have a hexagonal cross section. This type of cellular structure is suitable for certain frequency ranges, more particularly high frequencies. For low frequencies, high-volume cells must be provided, resulting in an increased thickness of the cellular structure. However, the soundproofing coating must be as thin as possible.

The document FR-3.098.143 proposes a special cellular structure for increasing the cell volume without increasing the thickness of the cellular structure. Such a cellular structure comprises a plurality of rows of cells, each row comprising, in alternation, first cells that are open toward a first face to be placed against the porous layer and closed toward a second face to be placed against the reflective layer, and second cells that are closed toward the first face and open toward the second face, each first cell communicating with a second cell via a conduit positioned near the second face. Thus, the volume of a cell is the sum of the volumes of a first cell, a second cell and a conduit.

The rows of cells are all identical and are juxtaposed with each other while being offset, the first cells of a first row being adjacent to the second cells of a second row juxtaposed with the first.

In one embodiment, each row of cells is produced by placing two strips of material adjacent to each other. Each strip of material comprises, in alternation, a first cavity corresponding to half of a first cell, a second cavity corresponding half of a second cell, and a groove linking the first and second cavities and corresponding to half of a conduit.

In one mode of operation, a method for manufacturing a cellular structure comprises a step of shaping the strips of material to produce the cavities and a step of assembling the strips of material by welding or bonding.

This step of assembling the strips of material is lengthy and complicated, in order to limit the risk of deformation of the cavities.

The present invention is intended to overcome all or some of the drawbacks of the prior art.

SUMMARY OF THE INVENTION

To this end, the invention proposes an assembly jig for a cellular structure comprising first and second faces, together with a plurality of rows of cells, each comprising two strips of material adjacent to each other, each strip of material having hollow shapes and junction areas arranged so as to form, when the strips of material are joined, first cells, each having a first opening that opens on the first face and a cross section that increases toward the first face, and second cells, each having a second opening that opens on the second face and a cross section that increases toward the second face.

According to the invention, the assembly jig comprises:
- a housing, delimited by a base and first and second side faces, configured for housing the strips of material of a cellular structure to be formed, superimposed on each other,
- a plurality of pins configured to be positioned between the superimposed strips of material in the first and/or second cells.

The housing enables the strips of material to be kept superimposed on each other during assembly. When positioned in the first and second cells, the pins limit the deformations of the first and second cells while the strips of material are assembled together.

According to another feature, the base is movable in the housing in a direction parallel to the first and second side faces.

According to another feature, the base comprises a bearing face against which a first deposited strip of material is positioned, said bearing face having a geometry complementary to that of the first deposited strip of material.

According to another feature, the assembly jig comprises a pin for each of the first and second cells of the cellular structure to be formed.

According to another feature, each pin is designed so as to be fully housed in the first or second cell in which it is positioned in operation.

According to another feature, each pin has a shape which is approximately complementary to that of the first or second cell in which it is positioned in operation.

According to another feature, the assembly jig comprises at least one pin feed system, comprising a plurality of conduits opening on the first or second side face of the housing, and, for each conduit, a pin loader configured for feeding pins to the conduit and an actuator configured for pushing a pin present in the conduit into the housing.

According to another feature, the assembly jig comprises at least one first pin feed system, positioned on the first side face of the housing and configured for inserting pins into the first cells in operation, and at least one second pin feed system positioned on the second side face of the housing and configured for inserting pins into the second cells in operation.

According to another feature, the assembly jig comprises a compression system configured for compressing the strips of material against each other in the housing.

The invention also proposes an assembly device comprising an assembly jig according to any of the preceding features, at least one first robotic arm configured for depositing the strips of material in the housing of the assembly jig, at least one second robotic arm configured for joining the strips of material to each other, and at least one controller configured for controlling the actuators of the assembly jig and the first and second robotic arms in a coordinated manner.

The invention also proposes a method for assembling a cellular structure, using the assembly jig according to the invention, characterized in that the method comprises a sequence of cycles comprising a step of positioning pins, a step of depositing a strip of material and a step of joining the strips of material, these cycles being repeated until all the strips of material are deposited, the base being moved downward between each cycle.

According to a first mode of operation, the method comprises:
- at least one step of positioning pins in the hollow shapes of the first and second cells of the last strip of material deposited,
- a step of depositing a strip of material on the pins and the last strip of material deposited,
- a step of welding for joining the last two strips of material deposited, at the various junction areas,
- a step of depositing a strip of material on the last strip of material deposited,
- a step of welding for joining the last two strips of material deposited, at the first and second cells,
- this cycle of steps being repeated until all the strips of material are deposited, the base being moved downward between each cycle.

According to a second mode of operation, the method comprises:
- a step of depositing a strip of material on the base or on the last strip of material deposited,
- a step of spreading adhesive on each junction area of the last strip of material deposited,
- at least one step of positioning pins in the hollow shapes of the first and second cells of the last strip of material deposited,
- a step of depositing a strip of material on the pins and the last strip of material deposited,
- a step of spreading adhesive on the projecting shapes of the last strip of material deposited,
- this cycle of steps being repeated until all the strips of material are deposited, the base being moved downward between each cycle.

BRIEF DESCRIPTION OF THE DRAWINGS

Other features and advantages will be apparent from the following description of the invention, this description being provided solely by way of example, with reference to the attached drawings, of which.

DETAILED DESCRIPTION OF THE PREFERRED EMBODIMENTS

Figure 1:
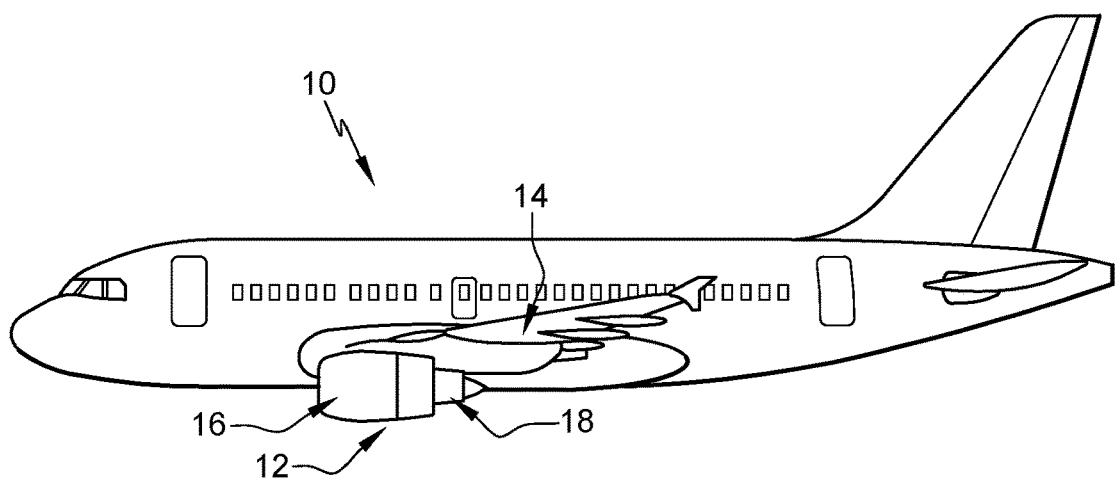
FIG. 1 is a side view of an aircraft.

FIG. 1 shows an aircraft 10 which has propulsion units 12 fixed under its wings 14. Each propulsion unit 12 comprises a nacelle 16 and a turbine engine 18 positioned inside the nacelle 16.

Figure 2:
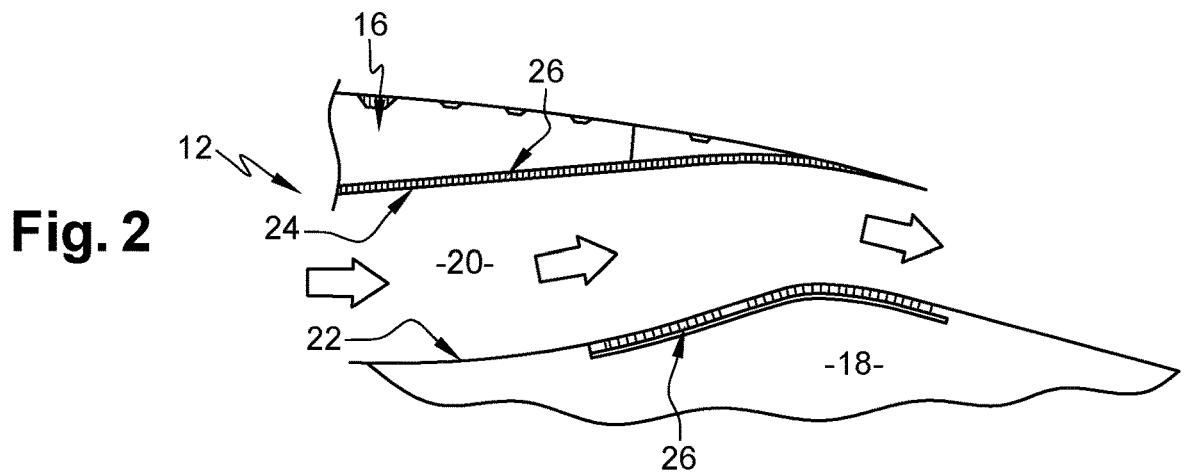
FIG. 2 is a schematic section through an exhaust duct of a propulsion unit of an aircraft comprising at least one soundproofing coating, illustrating an application of the invention.

In one embodiment shown in FIG. 2, the propulsion unit 12 comprises a secondary exhaust duct 20, channeling a secondary air flow, which is delimited by an inner wall 22 (also called an "inner fixed structure", or IFS) and by a wall 24 (also called an "outer fixed structure", or OFS).

According to one configuration, the inner wall 22 or the outer wall 24 comprises a soundproofing coating 26 (also called a soundproofing panel).

Although it has been described in application to a secondary exhaust duct 20, the invention is not limited to this application. Thus, the soundproofing coating 26 may be positioned on any surface in contact with a medium in which sound waves are propagated in operation, such as a lip and duct of an air inlet of an aircraft nacelle, a fan case of an aircraft nacelle, or any other surface of the propulsion unit 12, for example. Regardless of the configuration, the aircraft 10, and more particularly one of its propulsion units 12, comprises at least one soundproofing coating 26.

Figure 3:
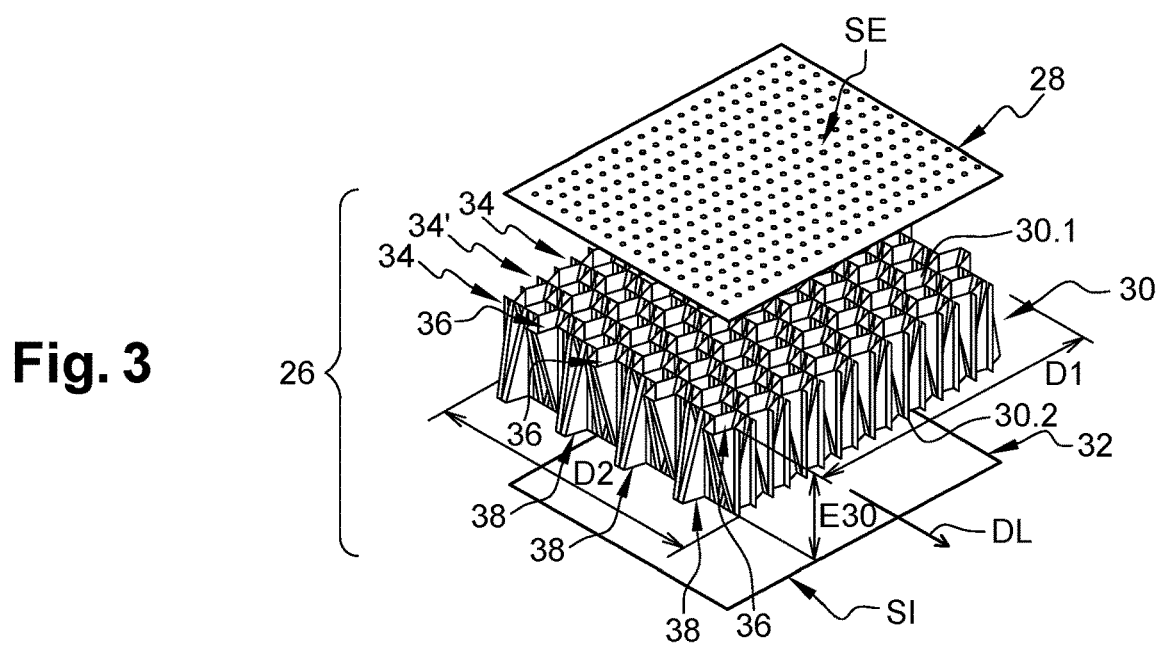
FIG. 3 is a perspective view of a soundproofing coating, illustrating an embodiment of the invention.

In one embodiment shown in FIG. 3, the soundproofing coating 26 has an outer surface SE, in contact with a medium in which sound waves are propagated in operation, and an inner surface SI opposite the outer surface SE. The soundproofing coating 26 comprises, from the outer surface SE toward the inner surface, a porous layer 28 (also called a sound-resistant layer), one face of which forms the outer surface SE, at least one cellular structure 30, and a reflective layer 32, one face of which forms the inner surface SI. Thus, the porous layer 28 is placed against a first face 30.1 of the cellular structure 30 and the reflective layer 32 is placed against a second face 30.2 of the cellular structure 30, opposite the first face 30.1.

Figure 4:
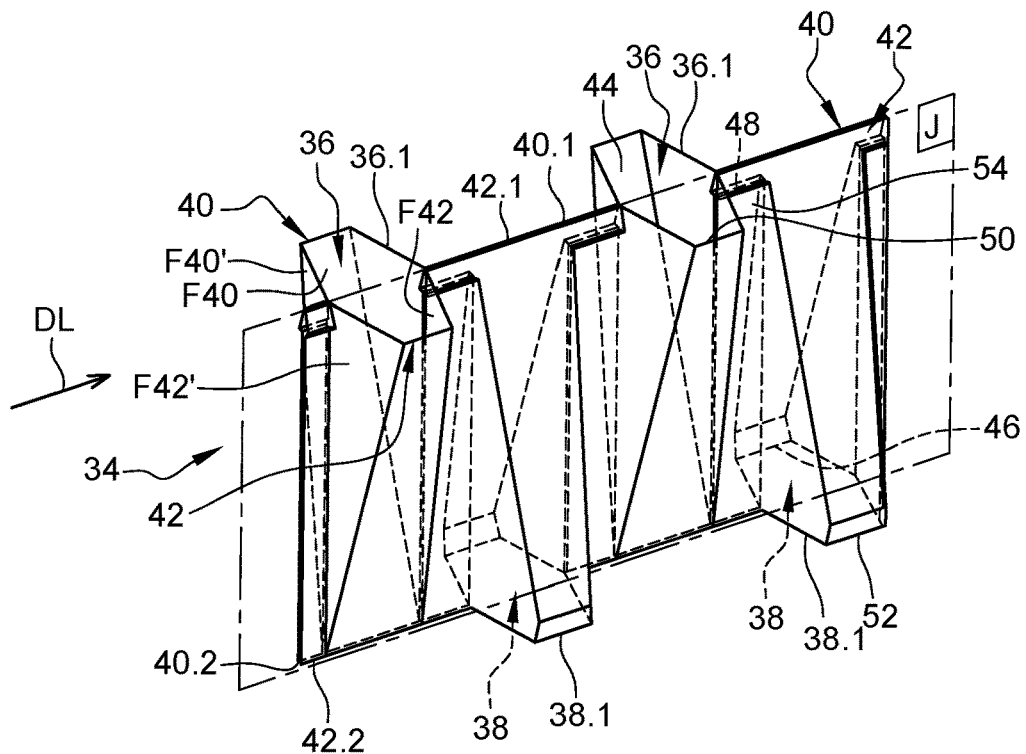
FIG. 4 is a perspective view of a row of cells of a cellular structure, illustrating an embodiment of the invention.

As illustrated in FIGS. 3 and 4, the cellular structure 30 comprises a plurality of rows of cells 34, 34', oriented in a longitudinal direction DL and each comprising, in alternation, first cells 36, each having a first opening 36.1 that opens on the first face 30.1 and a cross section that increases toward the first face 30.1, and second cells 38, each having a second opening 38.1 that opens on the second face 30.2 and a cross section that increases toward the second face 30.2.

Each row of cells 34, 34' comprises first and second strips of material 40, 42 placed adjacent to each other. The first strip of material 40 comprises a first inner face F40 oriented toward the second strip of material 42, and a first outer face F40' opposite the first inner face F40. The first strip of material 40 also comprises first and second longitudinal sides 40.1, 40.2 parallel to each other, the first and second longitudinal sides 40.1, 40.2 being positioned on the first and second faces 30.1, 30.2 respectively.

In parallel, the second strip of material 42 comprises a second inner face F42 oriented toward the first strip of material 40, and a second outer face F42' opposite the second inner face F42. The second strip of material 42 also comprises first and second longitudinal sides 42.1, 42.2 parallel to each other, the first and second longitudinal sides 42.1, 42.2 being positioned on the first and second faces 30.1, 30.2 respectively.

Each first strip of material 40 comprises, on its first face F40, first hollow shapes 44, second hollow shapes 46, and junction areas 48 separating the first and second hollow shapes 44, 46, the first and second hollow shapes 44, 46 alternating. The junction areas 48 are coplanar and are positioned in a reference plane. Each first hollow shape 44 forms a first half of a first cell 36. Each second hollow shape 46 forms a first half of a second cell 38.

Each second strip of material 42 comprises, on its first face F42, first hollow shapes 50, second hollow shapes 52, and junction areas 54 separating the first and second hollow shapes 50, 52, the first and second hollow shapes 50, 52 alternating. The junction areas 54 are coplanar and are positioned in a reference plane. Each first hollow shape 50 forms a second half of a first cell 36. Each second hollow shape 52 forms a second half of a second cell 38.

To produce a row of cells 34, 34', the first and second strips of material 40, 42 are placed adjacent to each other and then joined at their junction areas 48, 54 by bonding, welding or any other assembly method, so that the first and second hollow shapes 44, 46, 50, 52 form the first and second cells 36, 38.

According to one configuration, for each row of cells 34, 34', the first and second strips of material 40, 42 are identical, are placed against each other at the junction areas 48, 54, and are positioned symmetrically with respect to the reference planes of each of the first and second strips of material 40, 42, which are placed against each other to form a junction plane J.

The cellular structure 30 comprises a plurality of rows of cells 34, 34', all identical and are juxtaposed with each other while being offset, the first cells 36 of a first row of cells 34 being adjacent to the second cells 38 of a second row of cells 34' juxtaposed with the first row of cells 34.

Regardless of the mode of implementation, the cellular structure 30 comprises a plurality of strips of material 40, 42 juxtaposed with each other, each of the strips of material 40, 42 comprising, in alternation, hollow shapes 44, 46, 50, 52 and junction areas 48, 54, the strips of material 40, 42 being arranged so that the hollow shapes 44, 46, 50, 52 delimit first and second cells 36, 38 and are joined together at the junction areas 48, 54 which are placed against each other. Thus, each strip of material 40, 42 has a first face F40, F42 which exhibits, in alternation, hollow shapes and coplanar flat shapes corresponding to the junction areas 48, 54, and a second face F40', F42', the hollow shapes 44, 46, 50, 52 forming projecting shapes on said second face F40', F42'.

According to the embodiment shown in FIG. 4, the first and second cells 36, 38 are positioned in one of every two areas between two strips of material. According to another embodiment, the first and second cells could be positioned between each area between two strips of material.

The cellular structure 30 has a thickness E30 corresponding to the distance between the first and second faces 30.1, 30.2. This thickness E30 is substantially constant. According to a simplified configuration, the first and second faces 30.1, 30.2 are flat and parallel to each other. Usually, the first and second faces 30.1, 30.2 are curved and have substantially the same geometry. The cellular structure 30 has a first dimension D1 corresponding to the dimension in a first direction perpendicular to the junction planes J. The cellular structure 30 has a second dimension D2 corresponding to the dimension in a second direction perpendicular to the first direction.

The method for manufacturing a cellular structure 30 comprises a step of shaping the strips of material 40, 42 to produce the cavities and a step of assembling the strips of material 40, 42 together. The strips of material 40, 42 are joined at their junction areas 48, 54 to form rows of cells 34, 34', and at the first and second cells 36, 38 to form two juxtaposed rows of cells 34, 34'.

According to one mode of operation, the step of shaping the strips of material 40, 42 is carried out by forging, pressing or bending. Evidently, the invention is not limited to these solutions for shaping the strips of material 40, 42.

In the assembly step, the strips of material 40, 42 are superimposed on each other in an assembly jig 56 which has a housing 58 delimited by first and second side faces 58.1, 58.2, separated by a distance substantially equal to the thickness E30 of the cellular structure 30, and by a base 62. The first and second side faces 58.1, 58.2 of the housing 58 have geometries which are identical to the first and second faces 30.1, 30.2, respectively, of the cellular structure 30.

The assembly jig 56 has an upper face F56 onto which the housing 58 opens via an opening 60.

In one embodiment, the base 62 is stationary, and its distance from the opening 60 is greater than or equal to the first dimension D1 of the cellular structure 30.

According to another embodiment, the base 62 is movable in a direction parallel to the first and second side faces 58.1, 58.2 in the housing 58, between a high position in which the base 62 is near the opening 60 and a low position in which the base 62 is distant from the opening 60, the high and low positions being spaced apart by a distance suitable for housing the cellular structure 30. According to this embodiment, the assembly jig 56 comprises a movement system 63 configured for moving the base 62 from the high position to the low position and vice versa.

According to one configuration, the movement system 63 comprises at least one rack or at least one linear actuator for moving the base 62 vertically. Evidently, the invention is not limited to this configuration for the movement system 63.

Regardless of the mode of implementation, the housing 58 is configured for housing the strips of material 40, 42 of the cellular structure 30 to be formed, superimposed on each other, and for immobilizing them in a direction perpendicular to the first and second side faces 58.1, 58.2.

The base 62 comprises a bearing face F62 against which is positioned the first strip of material 40 introduced into the housing 58.

According to one configuration, the bearing face F62 of the base 62 comprises an alternation of hollow shapes and flat shapes, having a geometry complementary to the second face F40' of the first strip of material 40 deposited. Substantially the whole of the second face F40' is thus in contact with the bearing face F62, so that the downward vertical forces applied to the first strip of material 40 can be taken up.

The assembly jig 56 also comprises a plurality of pins 64, configured to be positioned between the superimposed strips of material 40, 42 in the first and/or second cells 36, 38 formed by the hollow shapes 44, 46, 50, 52 of the strips of material 40, 42.

According to one arrangement, the assembly jig 56 comprises a pin 64 for each of the first and second cells 36, 38 of the cellular structure 30 to be formed.

Each of the pins 64 has a shape which is approximately complementary to that of the first or second cell 36, 38 in which it is positioned. Each pin 64 comprises a side face in contact with practically the whole surfaces of the walls delimiting the first or second cell 36, 38 in which the pin is positioned.

Each pin 64 is designed so as to be fully housed in the first or second cell 36, 38 in which it is positioned, and so as not to project from the first or second face 30.1, 30.2 of the cellular structure 30 to be formed.

Figure 9:
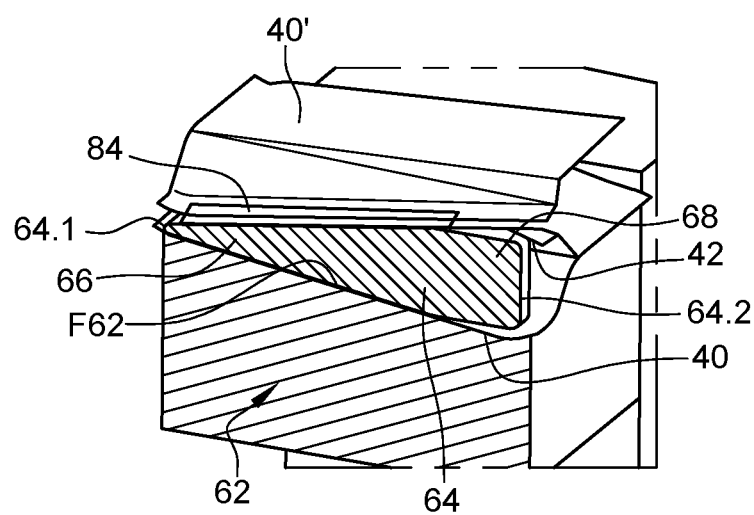
FIG. 9 is a perspective view of the assembly jig shown in FIG. 6.

In one embodiment, shown in FIG. 9, each pin 64 extends between first and second ends 64.1, 64.2, the first end 64.1 being designed to be positioned at the base of the first or second cell 36, 38 in which the pin 64 is positioned, the second end 64.2 being designed to be positioned at or near the first or second face 30.1, 30.2 of the cellular structure 30. Each pin 64 has a point 66 and a body 68, the point 66 extending from the first end 64.1 to the body 68, the body 68 extending from the second end 64.2 to the point 66. According to one configuration, the body 68 has a cross section (perpendicular to a direction extending between the first and second ends 64.1, 64.2) that is substantially constant. The point 66 has a cross section that decreases from the body 68 to the first end 64.1. This point 66 facilitates the insertion of the pin 64 into a cell 36, 38.

The housing 58 enables the strips of material 40, 42 to be kept superimposed on each other during assembly. When positioned in the first and second cells 36, 38, the pins 64 enable the strips of material 40, 42 to be kept immobile with respect to each other in the horizontal plane, and limit the deformations of the first and second cells 36, 38 while the strips of material 40, 42 are assembled together.

The pin 64 may be deposited on the last strip of material deposited, in its hollow shapes, and/or inserted between the strips of material already deposited.

The pins 64 may be deposited manually or automatically, using a robotic arm for example.

In one embodiment, the assembly jig 56 comprises at least one pin feed system 70, 70'. Each of these systems comprises a plurality of conduits 72, 72' opening on the first or second side face 58.1, 58.2 of the housing 58, at a row of first or second cells 36, 38 of the cellular structure 30 to be formed, and, for each conduit 72, 72', a pin loader configured for feeding pins to the conduit 72, 72' and an actuator 74, 74' configured for pushing each pin 64 present in the conduit 72, 72' into the housing 58, more particularly into a hollow shape or a cell positioned in the prolongation of the conduit 72, 72'.

According to one arrangement, the assembly jig 56 comprises at least a first pin feed system 70, positioned on the first side face 58.1 of the housing 58 and configured for inserting pins 64 into the first cells 36 in operation, and at least a second pin feed system 70' positioned on the second side face 58.2 of the housing 58 and configured for inserting pins 64 into the second cells 38 in operation. The first conduits 72 of the first pin feed system 70 are configured for guiding the pins 64 intended for the first cells 36 of the cellular structure 30, pushed by the first actuators 74. These first conduits 72 are regularly distributed in a first plane P1 substantially parallel to the upper face F56 of the assembly jig 56. The second conduits 72' of the second pin feed system 70' are configured for guiding the pins 64 intended for the second cells 38 of the cellular structure 30, pushed by the second actuators 74'. These second conduits 72' are regularly distributed in a second plane P2 substantially parallel to the first plane P1 and offset from the latter by a distance equal to the distance between the junction planes J of two juxtaposed rows of cells 34, 34'. In a variant, the first and second planes P1, P2 are substantially coplanar.

Figure 10:
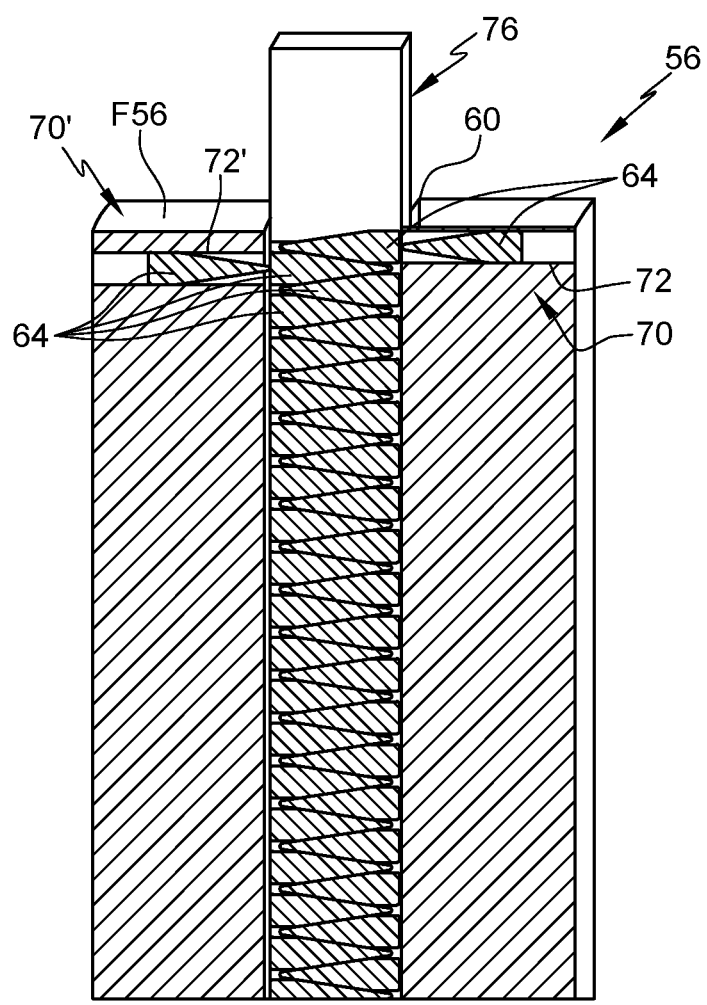
FIG. 10 is a section through part of the assembly jig shown in FIG. 6, after the positioning of the last strip of material.

According to an embodiment shown in FIG. 10, the assembly jig 56 comprises a compression system 76 configured for compressing the strips of material 40, 42 against each other in the housing 58 of the assembly jig 56.

According to one configuration, this compression system 76 comprises a bearing face configured for fitting to the shapes of the last strip of material 40, 42 deposited. In operation, the compression system 76 is placed against the last strip of material deposited and exerts a force toward the base 62.

The presence of such a compression system 76 is more particularly necessary when the joints between the strips of material are formed by bonding.

Figure 5:
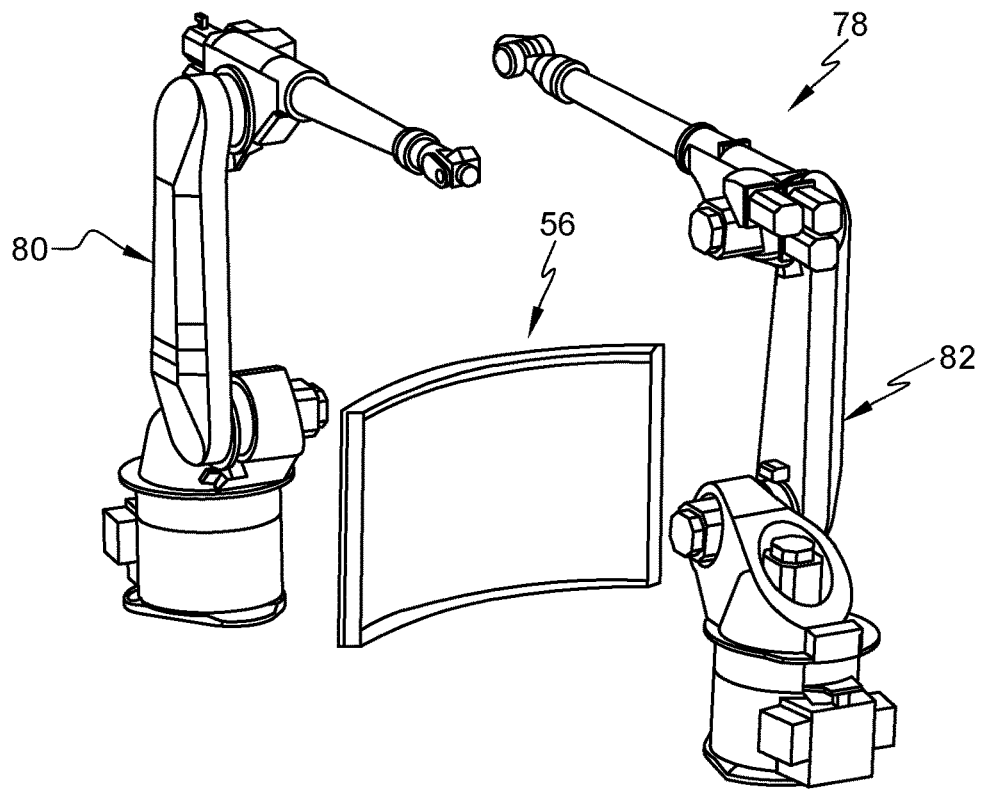
FIG. 5 is a perspective view of a device for assembling the strips of material of a cellular structure, illustrating an embodiment of the invention.
Figure 6:
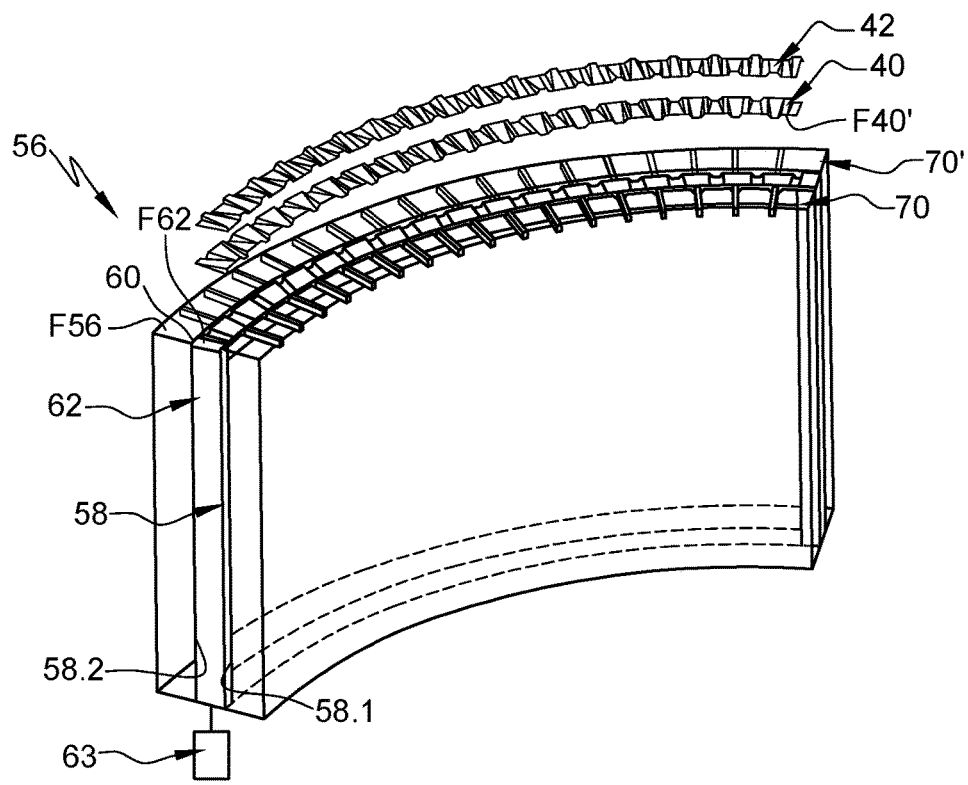
FIG. 6 is a perspective view of an assembly jig for the strips of material of a cellular structure, illustrating an embodiment of the invention.
Figure 7:
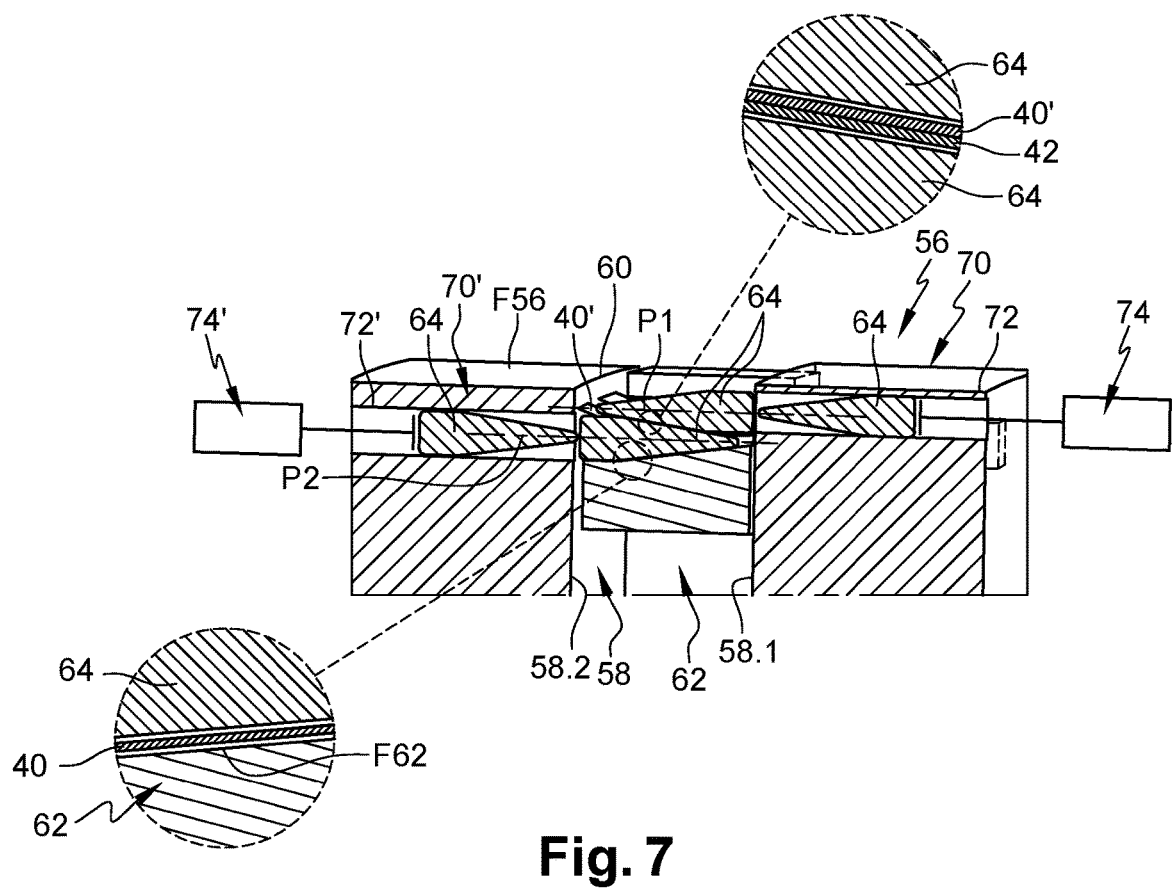
FIG. 7 is a section through part of the assembly jig shown in FIG. 6, before the positioning of a strip of material.
Figure 8:
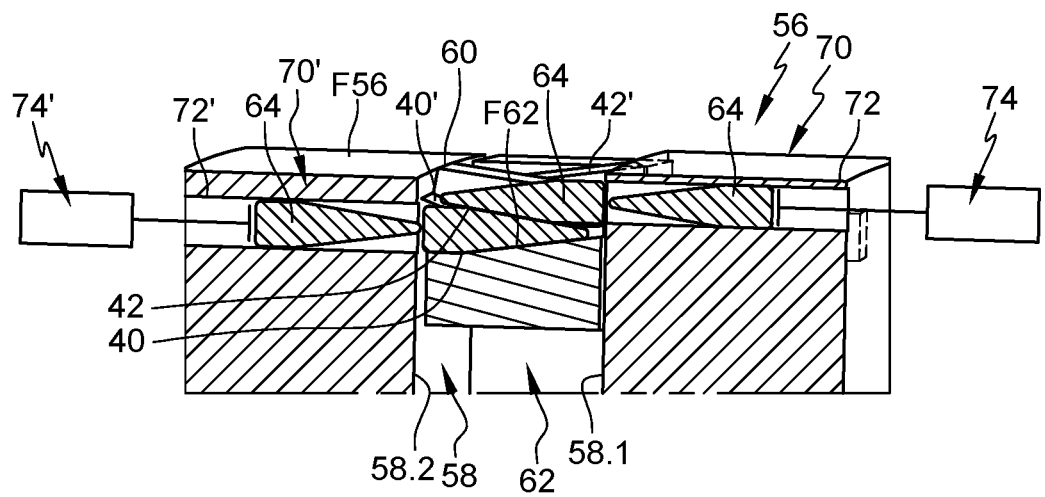
FIG. 8 is a section through part of the assembly jig shown in FIG. 6, after the positioning of a strip of material.

According to an embodiment shown in FIG. 5, an assembly device 78 comprises at least one assembly jig 56, at least a first robotic arm 80 configured for depositing the strips of material in the housing 58 of the assembly jig 56, at least a second robotic arm 82 configured for forming the joints connecting the strips of material, and at least one controller configured for controlling the movement system 63, the actuators 74 of the assembly jig 56 and the first and second robotic arms 80, 82 in a coordinated manner.

According to one configuration, the first robotic arm 80 comprises a head fitted with suction cups for picking up the strips of material 40, 42. The second robotic arm 82 comprises a welding or bonding head, depending on the assembly method used for joining the strips of material to each other.

According to a first mode of operation, the strips of material being joined by welding, the assembly method comprises:
- a step of depositing a first strip of material 40 on the base 62, carried out by the first robotic arm 80,
- a step of positioning the base 62 so that the first strip of material 40 is positioned immediately under the first conduits 72 of the first pin feed system 70,
- a step of positioning pins 64 in the hollow shapes 44 of the first and second cells 36 of the first strip of material 40, using the first actuators 74 of the first pin feed system 70,
- a step of moving the base 62 so that the first strip of material 40 is positioned immediately under the second conduits 72' of the second pin feed system 70',
- a step of positioning pins 64 in the hollow shapes 46 of the second cells 38 of the first strip of material 40, using the second actuators 74' of the second pin feed system 70',
- a step of depositing a second strip of material 42 on the pins 64 and the first strip of material 40, carried out by the first robotic arm 80,
- a step of welding, carried out by the second robotic arm 82, for joining the first and second strips of material 40, 42 at the various junction areas 48, 54,
- a step of depositing a new strip of material 40' on the second strip of material 42, carried out by the first robotic arm 80,
- a step of welding, carried out by the second robotic arm 82, for joining the first and second strips of material 42, 40' by welds 84, as shown in FIG. 9, at the first and second cells 36, 38.

With the exception of the first step, the cycle described above is repeated until all the strips of material have been deposited.

In a variant, if the conduits 72, 72' are positioned facing each other, approximately in the same plane, the method comprises, one strip of material 40 having already been positioned in the housing 58:
- at least one step of positioning pins 64 in the hollow shapes 44, 46 of the first and second cells 36, 38 of the second strip of material 40 deposited, using the actuators 74, 74' of the first and second pin feed systems 70, 70', a step of depositing a strip of material 42 on the pins 64 and the last strip of material 40 deposited, carried out by the first robotic arm 80, a step of welding, carried out by the second robotic arm 82, for joining the last two strips of material 40, 42 deposited, at the various junction areas 48, 54, a step of depositing a strip of material 40' on the last strip of material 42 deposited, carried out by the first robotic arm 80, a step of welding, carried out by the second robotic arm 82, for joining the last two strips of material 42, 40' deposited, at the first and second cells 36, 38, this cycle of steps being repeated until all the strips of material have been deposited, the base being moved downward by one interval between each cycle.

On the basis of the positioning of the first and second pin feed systems 70, 70', the step of positioning the pins 64 may be divided into two phases between which the base 62 is moved downward, the pins 64 being positioned in the first cells 36 in the first phase and in the second cell 38 in the second phase.

According to a second mode of operation, the strips of material being joined by bonding, the assembly method comprises:

a step of depositing a first strip of material 40 on the base 62, carried out by the first robotic arm 80, a step of spreading adhesive on each junction area 48 of the first strip of material 40, carried out by the second robotic arm 82, a step of positioning the base 62 so that the first strip of material 40 is positioned immediately under the first conduits 72 of the first pin feed system 70, a step of positioning pins 64 in the hollow shapes 44 of the first and second cells 36 of the first strip of material 40, using the first actuators 74 of the first pin feed system 70, a step of moving the base 62 so that the first strip of material 40 is positioned immediately under the second conduits 72' of the second pin feed system 70', a step of positioning pins 64 in the hollow shapes 46 of the second cells 38 of the first strip of material 40, using the second actuators 74' of the second pin feed system 70', a step of depositing a second strip of material 42 on the pins 64 and the first strip of material 40, carried out by the first robotic arm 80, a step of spreading adhesive on the projecting shapes of the second strip of material 42, carried out by the second robotic arm 82, a step of depositing a new strip of material 40' on the second strip of material 42, carried out by the first robotic arm 80.

With the exception of the first step, the cycle described above is repeated until all the strips of material have been deposited.

In a variant, the spreading step (b) may be carried out equally well after any of the steps (c) to (f).

Additionally, if the conduits 72, 72' are positioned facing each other, approximately in the same plane, the method comprises:

a step of depositing a strip of material 40 on the base 62 or on the last strip of material deposited, carried out by the first robotic arm 80, a step of spreading adhesive on each junction area 48 of the last strip of material 40 deposited, carried out by the second robotic arm 82, at least one step of positioning pins 64 in the hollow shapes 44, 46 of the first and second cells 36, 38 of the last strip of material 40 deposited, using the actuators 74, 74' of the first and second pin feed systems 70, 70', a step of depositing a strip of material 42 on the pins 64 and the last strip of material 40 deposited, carried out by the first robotic arm 80, a step of spreading adhesive on the projecting shapes of the last strip of material 42 deposited, carried out by the second robotic arm 82, this cycle of steps being repeated until all the strips of material have been deposited, the base 62 being moved downward by one interval between each cycle.

On the basis of the positioning of the first and second pin feed systems 70, 70', the step of positioning the pins 64 may be divided into two phases between which the base 62 is moved downward, the pins 64 being positioned in the first cells 36 in the first phase and in the second cells 38 in the second phase.

After the last strip of material has been deposited, the compression system 76 is positioned, as shown in FIG. 9, to compress the strips of material against each other in a step of curing or polymerization.

Regardless of the mode of operation, when the strips of material have been joined together, the cellular structure 30 is taken out of the housing 58, by shifting the base 62 upward, for example. Next, the pins 64 are withdrawn from the cells 36, 38.

The cellular structure 30 is then ready to be incorporated in a soundproofing coating 26 between a porous layer 28 and a reflective layer 32.

According to the modes of operation described above, the first and second cells 36, 38 being positioned in one of every two areas between two strips of material, the method comprises a sequence of cycles, each comprising a step of positioning pins 64, two steps of depositing strips of material 40, 42 and two steps of joining the strips of material 40, 42, these cycles being repeated until all the strips of material have been deposited, the base 62 being moved downward by one interval between each cycle.

According to other modes of implementation, the first and second cells 36, 38 being positioned in each area between two strips of material, the method comprises a sequence of cycles, comprising a step of positioning pins 64, a step of depositing a strip of material, and a step of joining the strips of material, the order of these steps varying according to the assembly technique used, these cycles being repeated until all the strips of material have been deposited, the base 62 being moved downward by one interval between each cycle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly jig for a cellular structure, the cellular structure comprising:

first and second faces, and a plurality of rows of cells,
each row of cells comprising two strips of material placed adjacent to each other, each strip of material having hollow shapes and junction areas arranged so as to form, when the strips of material are joined, first cells, each first cell having a first opening that opens on the first face and a cross section that increases toward the first face, and second cells, each second cell having a second opening that opens on the second face and a cross section that increases toward the second face,
wherein the assembly jig comprises:
a housing delimited by a base and first and second side face, configured for housing the strips of material of a cellular structure to be formed, superimposed on each other,
a plurality of pins configured to be positioned between the superimposed strips of material in at least one of the first or second cells, and,
at least one pin feed system comprising a plurality of conduits opening on the first or second side face of the housing, and, for each conduit, a pin loader configured to feed pins to the conduit and an actuator configured to push a pin present in the conduit into the housing.

2. The assembly jig as claimed in claim 1, wherein the base is movable in the housing in a direction parallel to the first and second side faces.

3. The assembly jig as claimed in claim 1, wherein the base comprises a bearing face against which a first deposited strip of material is positioned, said bearing face having a geometry complementary to that of the first strip of material deposited.

4. The assembly jig as claimed in claim 1, wherein the assembly jig comprises a pin for each of the first and second cells of the cellular structure to be formed.

5. The assembly jig as claimed in claim 1, wherein each pin is configured so as to be fully housed in the first or second cell in which said each pin is positioned in operation.

6. The assembly jig as claimed in claim 1, wherein each pin has a shape approximately complementary to that of the first or second cell in which said each pin is positioned in operation.

7. The assembly jig as claimed in claim 1, wherein the assembly jig comprises at least a first pin feed system, positioned on the first side face of the housing and configured to insert pins into the first cells in operation, and at least a second pin feed system positioned on the second side face of the housing and configured to insert pins into the second cells in operation.

8. The assembly jig as claimed in claim 1, wherein the assembly jig comprises a compression system configured to compress the strips of material against each other in the housing.

9. An assembly device comprising an assembly jig as claimed in claim 1, further comprising:
at least a first robotic arm configured to deposit the strips of material in the housing of the assembly jig,
at least a second robotic arm configured to join the strips of material to each other, and
at least one controller configured to control a movement system, actuators of the assembly jig and the first and second robotic arms.

10. A method for assembling a cellular structure using the assembly jig as claimed in claim 1, wherein the method comprises a sequence of cycles comprising:
a step of positioning the pins,
a step of depositing a strip of material, and
a step of joining the strips of material,
these cycles being repeated until all the strips of material have been deposited, the base being moved downward between each cycle.

11. A method for assembling a cellular structure using the assembly jig as claimed in claim 1, wherein the method comprises:
at least one step of positioning the pins in the hollow shapes of the first and second cells of the last strip of material deposited,
a step of depositing a strip of material on the pins and the last strip of material deposited,
a step of welding for joining the last two strips of material deposited, at the various junction areas,
a step of depositing a strip of material on the last strip of material deposited,
a step of welding to join the last two strips of material deposited, at the first and second cells,
this cycle of steps being repeated until all the strips of material have been deposited, the base being moved downward between each cycle.

12. A method for assembling a cellular structure using the assembly jig as claimed in claim 1, wherein the method comprises:
a step of depositing a strip of material on the base or on the last strip of material deposited,
a step of spreading adhesive on each junction area of the last strip of material deposited,
at least one step of positioning pins in the hollow shapes of the first and second cells of the last strip of material deposited,
a step of depositing a strip of material on the pins and the last strip of material deposited,
a step of spreading adhesive on the projecting shapes of the last strip of material deposited,
this cycle of steps being repeated until all the strips of material have been deposited, the base being moved downward between each cycle.

\* \* \* \* \*